(12) United States Patent
Nistala et al.

(10) Patent No.: US 12,493,892 B2
(45) Date of Patent: Dec. 9, 2025

(54) METHOD AND SYSTEM FOR EXTRACTING CONTEXTUAL PRODUCT FEATURE MODEL FROM REQUIREMENTS SPECIFICATION DOCUMENTS

(71) Applicant: Tata Consultancy Services Limited, Mumbai (IN)

(72) Inventors: Padmalata Venkata Nistala, Hyderabad (IN); Asha Sushilkumar Rajbhoj, Pune (IN); Vinay Kulkarni, Pune (IN); Shivani Soni, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 623 days.

(21) Appl. No.: 17/812,782

(22) Filed: Jul. 15, 2022

(65) Prior Publication Data
US 2023/0230115 A1    Jul. 20, 2023

(30) Foreign Application Priority Data
Dec. 22, 2021   (IN) .............................. 202121059936

(51) Int. Cl.
*G06Q 30/0204* (2023.01)
*G06F 40/103* (2020.01)
*G06F 40/40* (2020.01)

(52) U.S. Cl.
CPC ....... *G06Q 30/0205* (2013.01); *G06F 40/103* (2020.01); *G06F 40/40* (2020.01)

(58) Field of Classification Search
CPC .... G06Q 30/0205; G06F 40/103; G06F 40/40
See application file for complete search history.

(56) References Cited

U.S. PATENT DOCUMENTS

| | | | |
|---|---|---|---|
| 2016/0224996 A1* | 8/2016 | Hunt | G06F 16/283 |
| 2017/0221128 A1 | 8/2017 | Galitsky et al. | |
| 2018/0089242 A1* | 3/2018 | Lev | G06F 16/2228 |

OTHER PUBLICATIONS

Acher, Mathieu & Cleve, Anthony & Perrouin, Gilles & Heymans, Patrick & Collet, Philippe & Lahire, Philippe & Vanbeneden, Charles. (2012). On Extracting Feature Models From Product Descriptions. ACM International Conference Proceeding Series. 10.1145/2110147.2110153 (Year: 2012).*

(Continued)

*Primary Examiner* — Pierre Louis Desir
*Assistant Examiner* — Daniel W Chung
(74) *Attorney, Agent, or Firm* — Finnegan, Henderson, Farabow, Garrett & Dunner, LLP

(57) ABSTRACT

The present disclosure extracts contextual product feature model from requirement specification documents where the conventional methods fail to perform. Initially, the system receives a plurality of requirement specification documents pertaining to a product, a domain dictionary, a plurality of configuration parameters, and a plurality of extraction patterns. A product feature model is generated using a NLP based feature extraction technique. The product feature model includes a plurality of product feature elements comprising a feature area, a major feature and a plurality of features arranged hierarchically and classified into feature types. Further, a plurality of ContextType associations like core, client, geography and market are extracted for each of the plurality of features using a ContextType extraction technique. Finally, the plurality of ContextType associations is updated in the product feature model to obtain a contextual product feature model. Various types of feature exports can be generated using a natural language interface.

16 Claims, 13 Drawing Sheets

(56) References Cited

OTHER PUBLICATIONS

Mathieu Acher et al., "On Extracting Feature Models From Product Descriptions," Proceedings of the Sixth International Workshop on Variability Modeling of Software-Intensive, Jan. 2012, vol. 8 (2), pp. 45-54, ACM, https://www.researchgate.net/publication/216666571_On_Extracting_Feature_Models_From_Product_Descriptions/link/09e4150240a6d5f42b000000/download.

Anjali Sree-Kumar et al., "Extracting Software Product Line Feature Models from Natural Language Specifications," Proceedings of the 22nd International Systems and Software Product Line Conference, Sep. 2018, vol. 1, pp. 43-53, ACM, http://gres.uoc.edu/pubs/SPLC2018_Kumar.pdf.

Nan Tian et al., "Generating Product Feature Hierarchy from Product Reviews," International Conference on Web Information Systems and Technologies, 2014, Research Gate, https://www.researchgate.net/publication/300126408_Generating_Product_Feature_Hierarchy_from_Product_Reviews/link/5756389108ae155a87b9d0e5/download.

\* cited by examiner

METHOD AND SYSTEM FOR EXTRACTING CONTEXTUAL PRODUCT FEATURE MODEL FROM REQUIREMENTS SPECIFICATION DOCUMENTS

PRIORITY CLAIM

This U.S. patent application claims priority under 35 U.S.C. § 119 to: Indian Patent Application No. 202121059936, filed on Dec. 22, 2021. The entire contents of the aforementioned application are incorporated herein by reference.

TECHNICAL FIELD

The disclosure herein generally relates to the field of Natural language Processing (NLP) and, more particular, to a method and system for extracting contextual product feature model from requirements specification documents.

BACKGROUND

Product domains are complex and require highly skilled domain experts to understand the functionality, features, characteristics, corresponding requirements, and dependencies related to any product or application. Feature of a product is an aspect or characteristic of the domain visible to a user. It is expected that the requirements analysts have desired domain expertise to understand the functionality, associated interfaces, dependencies, and applicable business context of any product of that domain.

Conventionally, details about the specific application or product are strewn over multiple requirement specification documents and versions. For example, the requirement specification documentation pertaining to a large engagement includes thousands of pages. Multiple types of Natural Language (NL) documents are usually prepared depending on the nature of requirements. Further, the requirement information needs to be searched manually in these documents that is cumbersome and error prone. Further, many functionalities are duplicated across various documents. Hence, maintaining consistency of information across all these requirement specification documents is a challenge in the manual process. Hence there is a need to develop a holistic digitized picture of the knowledge about specific application or product like its features and the corresponding requirements, customized extensions and the like and make use of this knowledge to support effective requirements engineering tasks.

SUMMARY

Embodiments of the present disclosure present technological improvements as solutions to one or more of the above-mentioned technical problems recognized by the inventors in conventional systems. For example, in one embodiment, a method for extracting contextual product feature model from requirements specification documents is provided. The method includes receiving, by one or more hardware processors, data pertaining to a product, wherein the data comprises a plurality of requirement specification documents, a domain dictionary, a plurality of configuration parameters, and a plurality of extraction patterns. The method further includes identifying, by the one or more hardware processors, a plurality of sub products associated with the product based on a comparison between each of the plurality of requirement specification documents and a plurality of sub product patterns. The method further includes generating, by the one or more hardware processors, a product feature model for each of the plurality of sub products using a feature extraction technique, wherein the product feature model comprises a plurality of product feature elements arranged hierarchically based on a predefined hierarchy level, wherein the plurality of product feature elements comprises a feature area, a major feature, and a plurality of features. The method finally includes generating, by the one or more hardware processors, a contextual product feature model based on the product feature model using a ContextType extraction technique, wherein the ContextType comprises a core, a client, a geography, and a market.

In another aspect, a system for extracting contextual product feature model from requirements specification documents is provided. The system includes at least one memory storing programmed instructions, one or more Input/Output (I/O) interfaces, and one or more hardware processors operatively coupled to the at least one memory, wherein the one or more hardware processors are configured by the programmed instructions to receive data pertaining to a product, wherein the data comprises a plurality of requirement specification documents, a domain dictionary, a plurality of configuration parameters, and a plurality of extraction patterns. Further, the one or more hardware processors are configured by the programmed instructions to identify a plurality of sub products associated with the product based on a comparison between each of the plurality of requirement specification documents and a plurality of sub product patterns. Furthermore, the one or more hardware processors are configured by the programmed instructions to generate a product feature model for each of the plurality of sub products using a feature extraction technique, wherein the product feature model comprises a plurality of product feature elements arranged hierarchically based on a predefined hierarchy level, wherein the plurality of product feature elements comprises a feature area, a major feature, and a plurality of features. Finally, the one or more hardware processors are configured by the programmed instructions to generate a contextual product feature model based on the product feature model using a ContextType extraction technique, wherein the ContextType comprises a core, a client, a geography, and a market.

In yet another aspect, a computer program product including a non-transitory computer-readable medium having embodied therein a computer program for extracting contextual product feature model from requirements specification documents is provided. The computer readable program, when executed on a computing device, causes the computing device to receive data pertaining to a product, wherein the data comprises a plurality of requirement specification documents, a domain dictionary, a plurality of configuration parameters, and a plurality of extraction patterns. Further, the computer readable program, when executed on a computing device, causes the computing device to identify a plurality of sub products associated with the product based on a comparison between each of the plurality of requirement specification documents and a plurality of sub product patterns. Furthermore, the computer readable program, when executed on a computing device, causes the computing device to generate a product feature model for each of the plurality of sub products using a feature extraction technique, wherein the product feature model comprises a plurality of product feature elements arranged hierarchically based on a predefined hierarchy level, wherein the plurality of product feature elements comprises a feature area, a major feature, and a plurality of features. Finally, the computer readable program, when executed on a computing device, causes the computing device to generate a contextual product feature model based on the product feature model using a ContextType extraction technique, wherein the ContextType comprises a core, a client, a geography, and a market.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
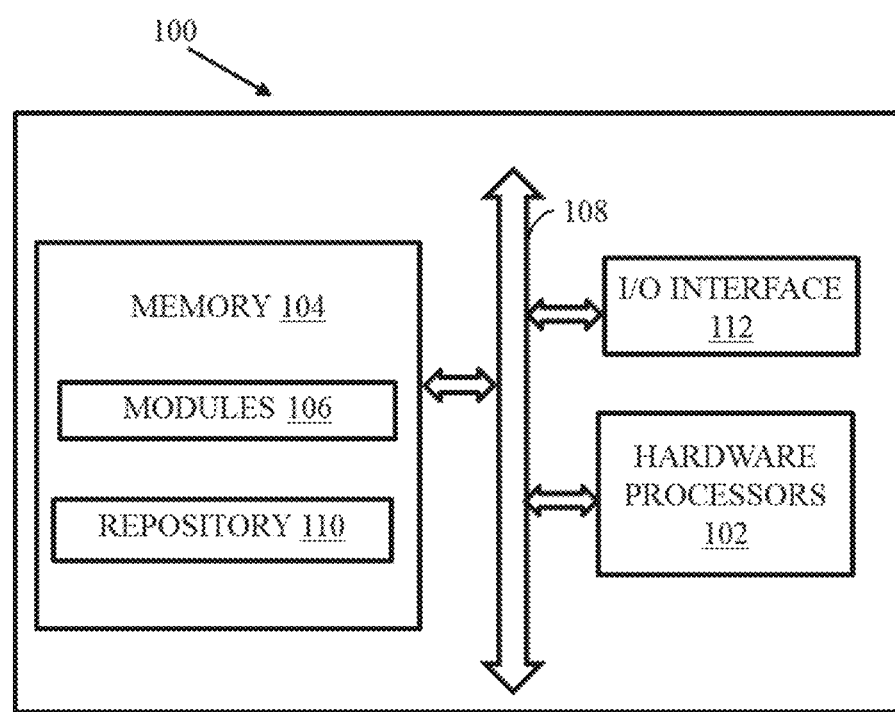
FIG. 1 is a functional block diagram of a system for extracting a contextual product feature model from requirement specification documents, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for Natural Language Processing (NLP) based automatic extraction of contextual feature model from requirement specification documents. Initially, the system receives a data pertaining to a product. The data includes a plurality of requirement specification documents, a domain dictionary, a plurality of configuration parameters, and a plurality of extraction patterns. Further, a plurality of sub products are extracted based on a comparison between each of the plurality of requirement specification documents and a plurality of sub product patterns. A product feature model is generated for each of the plurality of sub products using a feature extraction technique. The product feature model includes a plurality of product feature elements arranged hierarchically based on a predefined hierarchy level. The plurality of product feature elements includes a feature area, a major feature and a plurality of features. After generating the product feature model, a contextual product feature model is generated based on the product feature model using a ContextType extraction technique.

Referring now to the drawings, and more particularly to FIGS. 1 through 9B, where similar reference characters denote corresponding features consistently throughout the figures, there are shown preferred embodiments and these embodiments are described in the context of the following exemplary system and/or method.

FIG. 1 is a functional block diagram of a system 100 for extracting contextual product feature model from requirement specification documents, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

The plurality of modules 106 include programs or coded instructions that supplement applications or functions performed by the system 100 for extracting contextual product feature model from requirement specification documents. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for extracting contextual product feature model from requirement specification documents. In an embodiment, plurality of modules 106 includes a sub product identification and association module (shown in FIG. 7), a product feature model generation module (shown in FIG. 7) and a contextual product feature model generation module (shown in FIG. 7).

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

Figure 2:
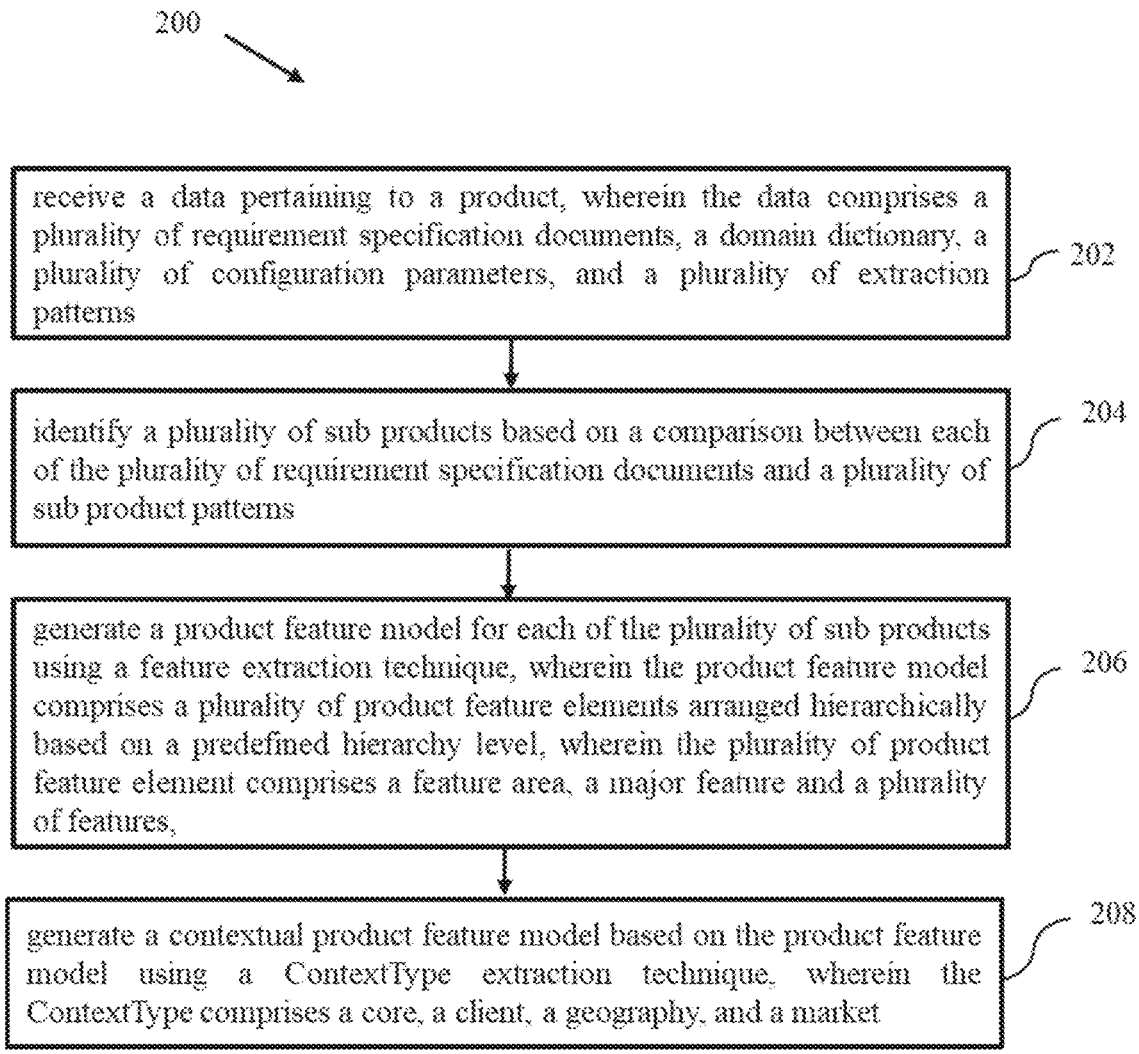
FIG. 2 is an exemplary flow diagram illustrating a method for extracting contextual product feature model from requirements specification documents, implemented by the system of FIG. 1, in accordance with some embodiments of the present disclosure.

FIG. 2 is an exemplary flow diagram illustrating a method 200 for extracting contextual product feature model from requirement specification documents implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 102 are configured by the programmed instructions to receive a data pertaining to a product. The data pertaining to the product includes a plurality of requirement specification documents, a domain dictionary, a plurality of configuration parameters, and a plurality of extraction patterns. The product can be from a plurality of domains like banking, insurance and the like.

The plurality of extraction patterns includes a plurality of sub product patterns, a plurality of feature area patterns, a plurality of major feature patterns, a plurality of feature patterns, a plurality of feature type patterns and a plurality of ContextType patterns. In an embodiment, the plurality of sub product patterns are file name text before underscore ("_") or First line in Title page. For example, if the file name is "Offering1_accounts", the sub product is "Offering1". The plurality of feature area patterns are file name text after the underscore ("_") or Table cell text with column heading "Component" in the tabular data. In the example of file name "Offering1_accounts", the sub product is "Offering1" feature area is "Accounts". The plurality of major feature patterns includes a plurality of major headings (Heading 1, Heading 2 and the like) in the document being processed. The plurality of feature patterns includes a plurality of sub headings ("Heading 2" or "Heading 3"), a table cell text with column heading "interface" and the like. The plurality of features is having a plurality of feature types including an IO function feature type, an interface feature type, a report feature type, a query feature type and the like. In an embodiment, the IO function feature type patterns includes the text including "use case", "screen" and the like. In an embodiment, the query feature type pattern includes a feature name with text "query", "enquire" "view" and the like. Examples for the report feature type patterns includes "report" and the like. In an embodiment, an interface feature type pattern includes a feature name with text "message", "interface" and the like. For example, if Heading2 is "Use case ACC001: Create and Maintain Accounts", then feature ID is "ACC001" and feature name is "Create and Maintain Accounts", and feature type is "IO function". The plurality of ContextType patterns are Heading 2 text including a context code or name, or a bold heading with context code or name in feature description. For example, if the feature description is having a bold heading named "Client 1 customization of accounts", then "Client1" is extracted as the ContexType.

Every feature comprises a set of properties that uniquely define that feature. There are standard characteristics and additional properties depending on the feature type. A feature ID (Identification number), a feature name and a feature description are the standard characteristics. In an embodiment, the interface feature type includes additional properties like source, target, direction, mode, frequency, file format and the like. A report feature type includes additional properties like report layout, language, distribution list, timing, and the like.

The plurality of configuration parameters includes the predefined hierarchy level and a predefined list of clients, a predefined list of geographies and a predefined list of markets. The predefined list of clients are a list of client organizations procuring a particular product. For example, banks, insurance companies and the like. The predefined list of geographies includes a plurality of continents or a plurality of countries within a plurality of continents where the particular product has market value. For example, "AUS (Australia)", "MEA (Middle East Asia)" and the like. The predefined list of markets are the market places within a geography where the product is having market value. It can be any operating like "Market-India", "Market-Katar" and the like. For example, if the predefined hierarchy level is three, the levels of the product feature tree include feature area, major feature and features. If the predefined hierarchy level is four, the product feature tree includes feature area, major feature, features, and sub features.

At step 204 of the method 200, the one or more hardware processors 102 are configured by the programmed instructions to identify a plurality of sub products associated with the product based on a comparison between each of the plurality of requirement specification documents and the plurality of sub product patterns. A product may have one or more sub products. Each of the plurality of products includes a plurality of product properties. The plurality of product properties includes a product ID, a product name and a product description. Each of the plurality of sub products includes a plurality of sub product properties. The plurality of sub product properties includes a sub product ID, a sub product name and a sub product description.

At step 206 of the method 200, the one or more hardware processors 102 are configured by the programmed instructions to generate a product feature model for each of the plurality of sub products using a feature extraction technique (explained with reference to FIGS. 3A and 3B). The product feature model includes a plurality of product feature elements arranged hierarchically based on a predefined hierarchy level. The plurality of product feature elements includes the feature area, the major feature and the plurality of features. For example, if the predefined hierarchy level is three, for each sub product, the levels of the product feature elements include the plurality of feature areas, the plurality of major features and the plurality of features. If the predefined hierarchy level is four, each sub product of the product feature tree includes the plurality of feature areas, the plurality of major features, the plurality of features, and the plurality of sub features. For example, the product feature model given in FIG. 4 is having the hierarchy level as 3. Here, there are 3 levels of product feature elements for each sub product "Offering1" and "Offering2".

In an embodiment, the feature area is defined as a cluster of features comprising a functional module. The term 'major feature' represents set of features that form a logical functional unit. Each of the major features includes one or more small logical functional units called the plurality of features. For example, the logical functional unit is capable of performing a function. In an embodiment, if the major feature is "Create Accounts", then the corresponding set of features are "Create and maintain accounts", "perform book keeping" and the like. Here, the major feature ("Create Accounts") is the logical functional unit and the set of features are the small logical functional units. These three levels of hierarchy comprising the feature area, the major feature and the plurality of features can be further decomposed into a plurality of hierarchy levels based on the requirement of a user.

Each of the plurality of features is associated with the feature type. The classification of features into feature types is useful to carry out design, estimating efforts, development planning and the like. The feature type includes the IO function feature type, the interface, a query and a report. Further, each of the plurality of product feature elements includes a plurality of feature properties. The plurality of feature properties includes a feature ID, a feature name, and a feature description.

In an embodiment, the IO function feature type is a basic Input-Output (IO) functional unit that is part of an application and provides facilities to users to carry out their tasks. Various CRUD (Create Read Update Delete) operations are supported through these functions. For example, use case type of functions in specification documents are mapped to IO Function.

In an embodiment, the "interface" feature type is a shared boundary between two functional units like major feature or the plurality of features, defined by various characteristics pertaining to the functions. Data in a predefined format is exchanged between two functional units. Electronic data exchange (EDI) is a common mode of data exchange between interfaces. Most systems have external interfaces with other systems. Features having names embedding words such as interface/Message etc. are classified into interface feature type. An interface feature will have additional feature properties including a source system, a target system, a direction, a file format, a mode, a frequency, and the like.

In an embodiment, a Report or Management Information System (MIS) reports are a standard part of products or applications. Listing of transactions or activities carried out in the system within a time period are usually generated as reports for business stakeholders. Features having names embedding word report are classified into Report feature type. A report feature has additional feature properties including a report layout, a distribution list, the file format, a timing and the like.

In an embodiment, the query is a special type of function where information is queried and retrieved. Only View operation is allowed in query screens. For example, features names embedding words such as "view", "query", "enquire" etc. are classified into query feature type. Steps involved in the process of generating the product feature model are depicted in FIGS. 3A and 3B, and are explained hereafter.

Figure 3A:
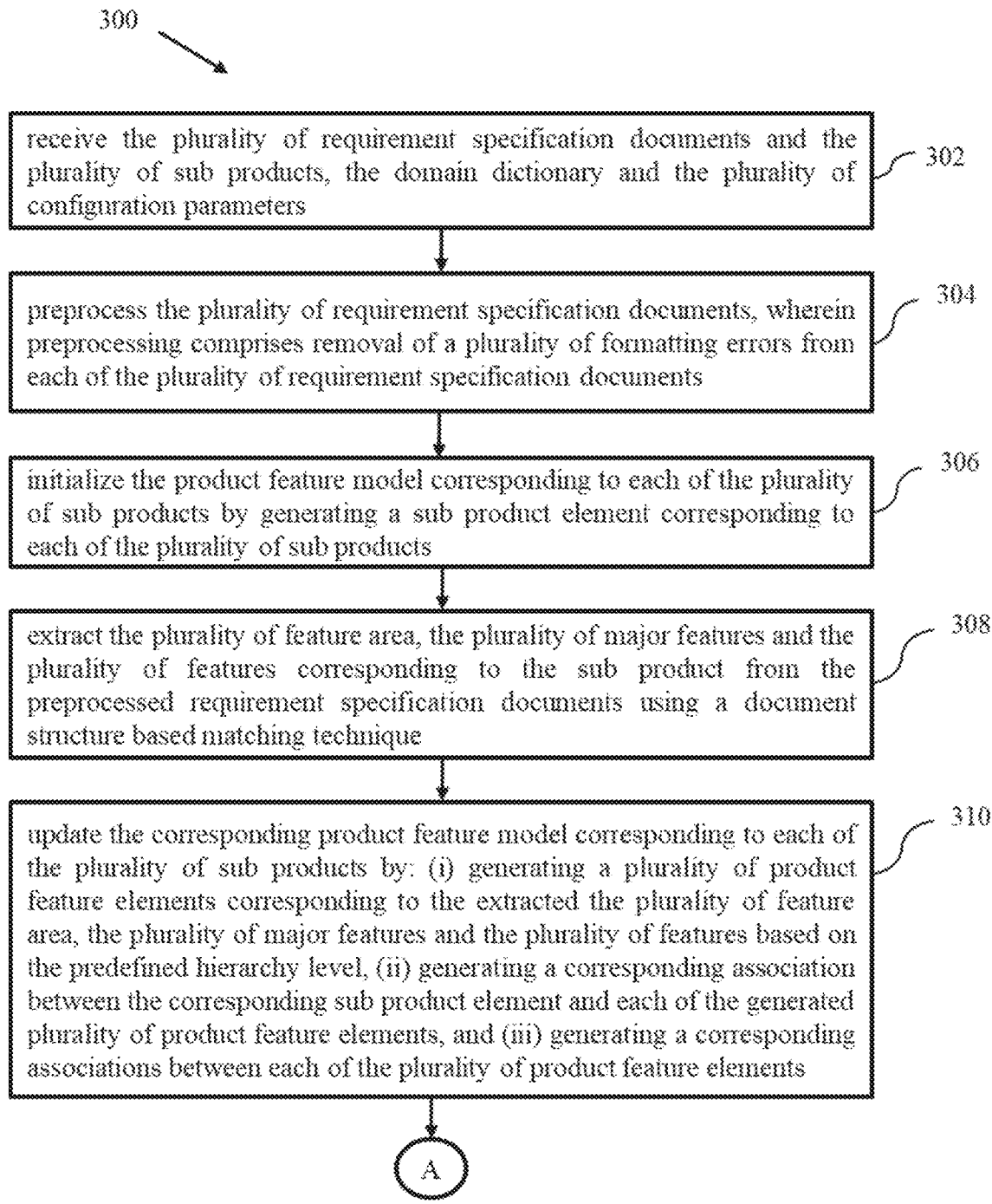
FIGS. 3A and 3B are exemplary flow diagrams for generating a product feature model implemented by the system of FIG. 1, in accordance with some embodiments of the present disclosure.
Figure 3B:
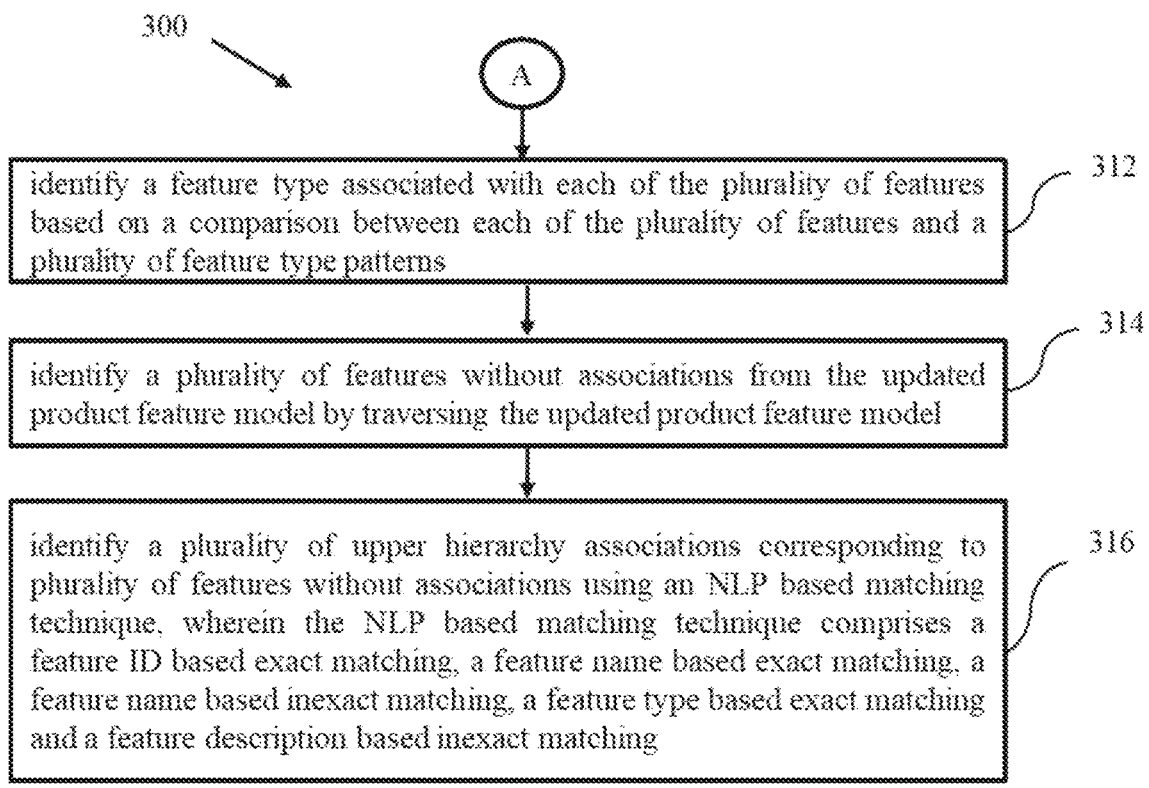
Figure 4:
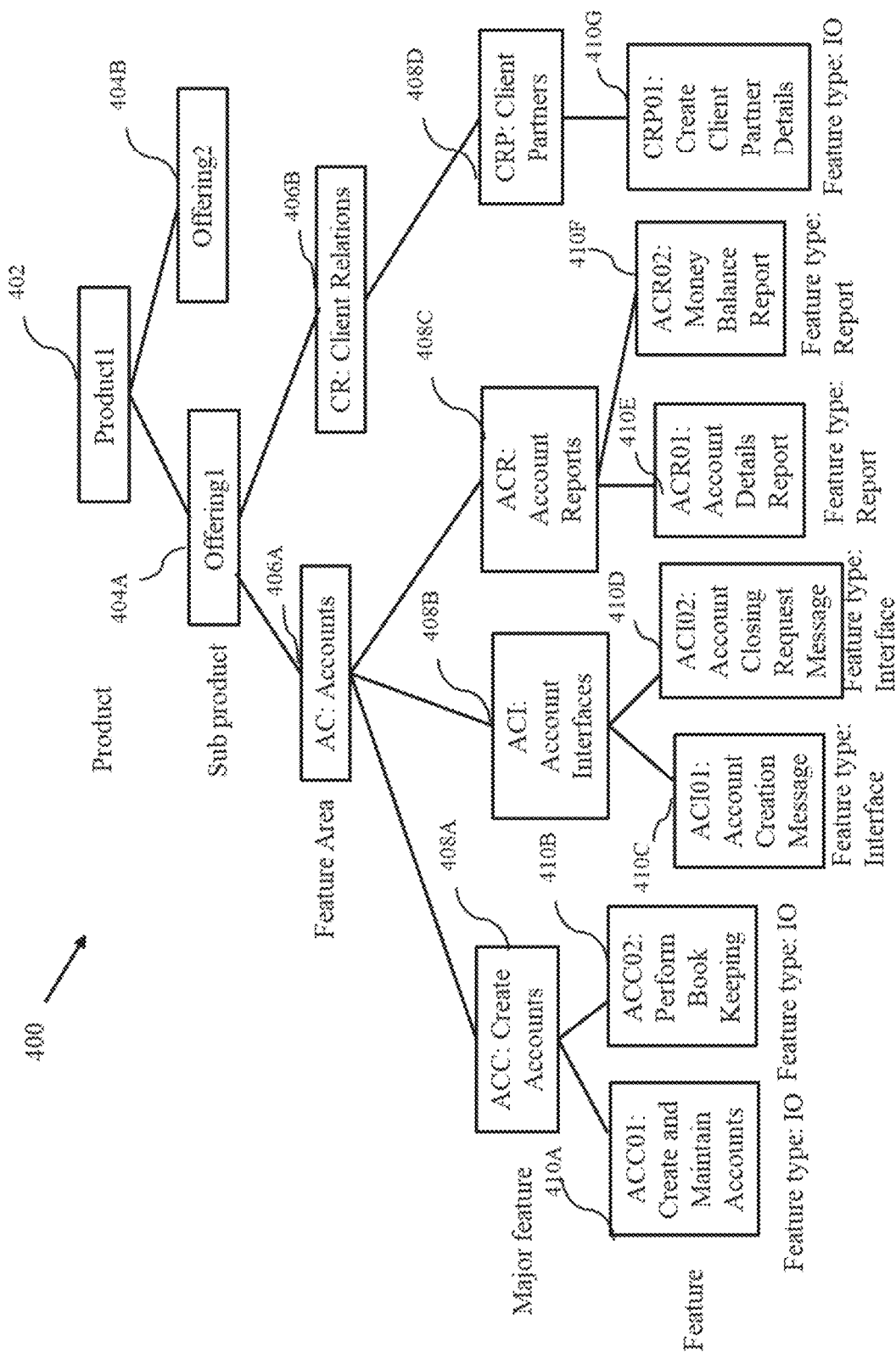
FIG. 4 is an exemplary product feature model for the processor implemented method for extracting contextual product feature model from requirements specification documents, implemented by the system of FIG. 1, in accordance with some embodiments of the present disclosure.

Now referring to FIGS. 3A and 3B, the plurality of requirement specification documents and information on the plurality of sub products, the domain dictionary, and the plurality of configuration parameters are received at step 302. The plurality of requirement specification documents are preprocessed at step 304. The preprocessing includes removal of a plurality of formatting errors. At step 306, a product feature model corresponding to each of the plurality of sub products is initialized by generating a sub product element corresponding to each of the plurality of sub products. At step 308, the plurality of feature area, the plurality of major features and the plurality of features corresponding to the sub product are extracted from the preprocessed requirement specification documents using a document structure based matching technique. The document structure based matching technique extracts the plurality of feature area, the plurality of major features and the plurality of features based on a comparison between a plurality of document structures corresponding to the plurality of preprocessed requirement specification documents and the plurality of corresponding extraction patterns. The plurality of document structures includes a heading structure and a table structure. In an embodiment, the heading structure includes a set of features listed in the requirement specification document as part of a three or four level heading structure with Heading1, Heading 2, Heading 3 and the like. Similarly, table structure includes a set of features and their properties listed as part of the table data in the requirement specification document. For example, a functional specification document may include uses case listed as part of the heading structure and a interface specification document may list all the interfaces in a table. At step 310, the product feature model corresponding to each of the plurality of sub products is updated using the following three steps (i) generating a plurality of product feature elements corresponding to the extracted the plurality of feature area, the plurality of major features and the plurality of features based on the predefined hierarchy level, (ii) generating a corresponding association between the corresponding sub product element and each of the generated plurality of product feature elements, and (iii) generating a corresponding associations between each of the plurality of product feature elements. At step 312, the feature type associated with each of the plurality of features is identified based on a comparison between each of the plurality of features and the plurality of feature type patterns. At step 314, a plurality of features without associations are identified from the updated product feature model by traversing the updated product feature model. The plurality of features without associations are alternatively referred as the plurality of target features. Finally, at step 316, a plurality of upper hierarchy associations corresponding to plurality of target features are identified using a plurality of NLP based matching techniques. The upper hierarchy associations are the association between the plurality of target features and the plurality of product feature elements above the plurality of target features in the product feature model. The plurality of NLP based matching technique comprises a feature ID based exact matching, a feature name based exact matching, a feature name based inexact matching, a feature type based exact matching and a feature description based inexact matching.

In an embodiment, the feature ID based exact matching compares the IDs of each of the plurality of target features with the IDs corresponding to each of the plurality of product feature elements in the product feature model. The feature name based exact matching compares the names of each of the plurality of target features with the names corresponding to each of the plurality of product feature elements in the product feature model. The feature name based inexact matching compares the names of each of the plurality of target features with the names corresponding to each of the plurality of product feature elements in the product feature model. The feature type based exact matching compares the feature types of each of the plurality of target features with the feature types corresponding to each of the plurality of product feature elements in the product feature model. The feature description based inexact matching compares the feature description of each of the plurality of target features with the feature description corresponding to each of the plurality of product feature elements in the product feature model.

FIG. 4 is an exemplary product feature model 400 for the processor implemented method for extracting contextual product feature model from requirement specification documents, implemented by the system of FIG. 1, in accordance with some embodiments of the present disclosure. Now referring to FIG. 4, the system 400 is an example product feature model. The product feature model illustrated in FIG. 4 includes a product "Product1" 402. The product 402 includes two sub products named "Offering1" 404A and "Offering2" 404B. The sub products 404A and 404B are having a corresponding association with the product 402. The sub product 404 includes a plurality of feature areas "AC: Accounts" 406A and "CR: Client Relations" 406B. The feature area 406A includes a plurality of major features named "ACC: Create Accounts" 408A, "ACI: Account Interfaces" 408B and "ACR: Account Reports" 408C. Further, the feature area 406B includes a major feature named "CRP: Client Partners" 408D. Further, the major feature 408A includes a plurality of features named "ACC01: Create and Maintain Accounts" 410A, "ACC02: Perform Book Keeping" 410B. Similarly, the major feature 408B includes the features named "ACI01: Account Creation Message" 410C, "ACI01: Account Closing Request Message" 410D. Similarly, the major feature 408C includes the features "ACR01: Account Details Report" 410E, "ACR02: Money balance Report" 410F and the major feature 408D includes the feature "CRP01: Create Client Partner details" 410G. The feature type associated with the features 410A, 410B and 410G is "IO Function". The feature type associated with the features 410C and 410D is "interface". The feature type associated with the features 410E and 410F is "report".

At step 208 of the method 200, the one or more hardware processors 102 are configured by the programmed instructions to generate contextual product feature model based on the product feature model using a ContextType extraction technique. In an embodiment, the ContextType or contextual information includes a core, a client, a geography and a market.

In an embodiment, the contextual information determines whether a particular feature is applicable in a particular client implementation. It can be specified through multiple ContextTypes such as the client, the market, the geography and the like. The core product features are part of all implementations. The "client" ContextType specifies to a plurality of features specific to a client. Further, a plurality of attributes, business rules are quite specific to the client and are implemented only for the client. The "market" or "geography" specific ContextType specifies a plurality of features specific to a market currency and transaction rules often changes based on the operating market such as India, North America, Canada and so on. Further, a plurality of additional ContextTypes can also be configured as required. For example, the plurality of additional ContextTypes includes a "market segment" and the like.

Figure 5A:
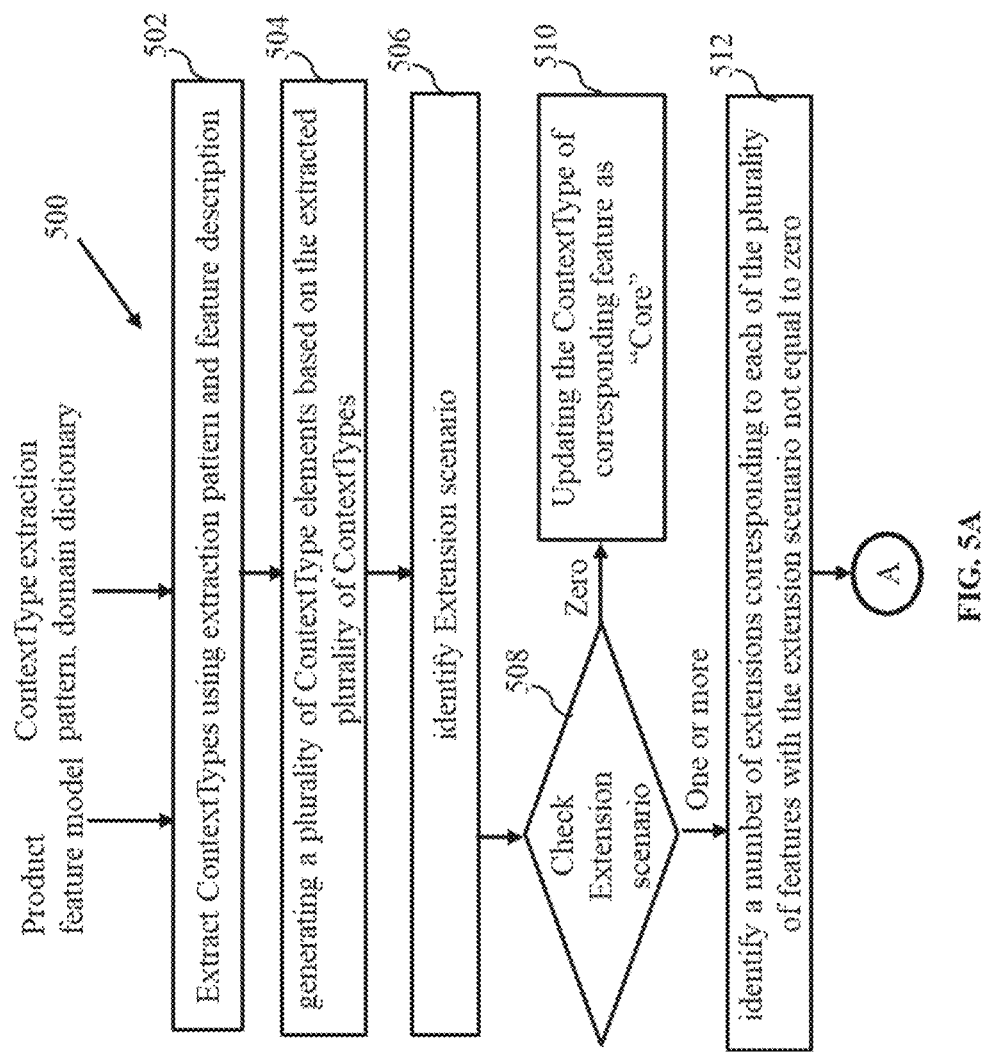
FIGS. 5A and 5B are exemplary flow diagrams for generating a contextual product feature model for the processor implemented method for extracting contextual product feature model from requirements specification documents, implemented by the system of FIG. 1, in accordance with some embodiments of the present disclosure.
Figure 5B:
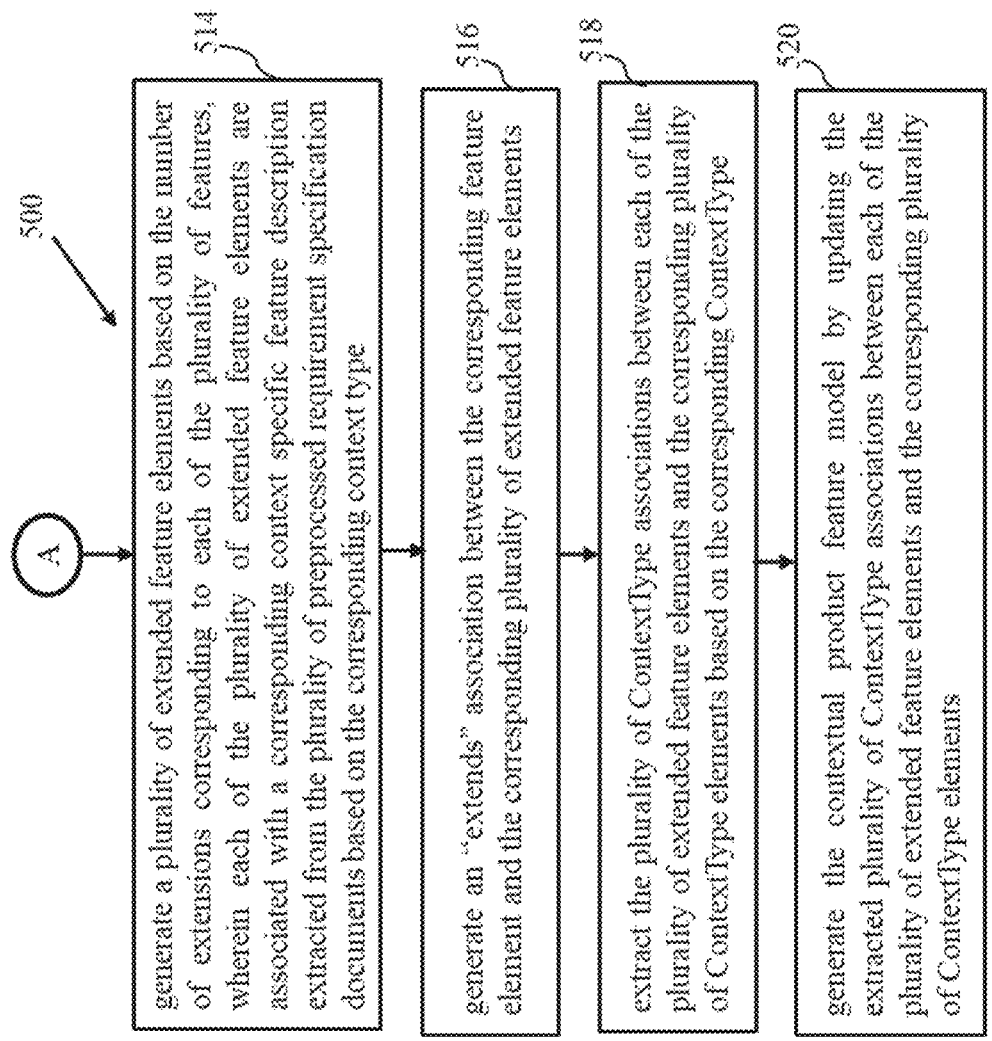

FIGS. 5A and 5B are the exemplary flow diagram 500 for generating the contextual product feature model based on the product feature model using a ContextType extraction technique for the processor implemented method for extracting contextual product feature model from requirement specification documents, implemented by the system of FIG. 1, in accordance with some embodiments of the present disclosure. Now referring to FIGS. 5A and 5B, initially, the product feature model and the plurality of ContextType extraction parameters and the domain dictionary are received as input. At step 502, a plurality of ContextType is extracted for each of the plurality of features in the product feature model based on a comparison between the plurality of ContextType extraction patterns and the corresponding description associated with each of the plurality of features. The plurality of ContextType comprises the core, the client, the market and the geography. At step 504, a plurality of ContextType elements are generated based on the extracted plurality of ContextTypes. At step 506, a plurality of extension scenario are identified for each of the plurality of features based on the corresponding plurality of ContextTypes. The extension scenario is set to one if there is at least one ContextType and the extension scenario set to zero if there is no ContextType. At step 508, the extension scenario is checked whether it is equal to zero or greater than zero. At step 510, a ContextType for the plurality of feature with extension scenario equal to zero are updated as "core". At step 512, a number of extensions corresponding to each of the plurality of features with the extension scenario not equal to zero are identified. At step 514, a plurality of extended feature elements are generated based on the number of extensions corresponding to each of the plurality of features, wherein each of the plurality of extended feature elements are associated with a corresponding context specific feature description extracted from the plurality of preprocessed requirement specification documents based on the corresponding ContextType. At step 516, an "extends" association is generated between the feature and the corresponding extended feature element. For example, the "extends" association indicates that the corresponding feature is having an extended association, for example, the ContextType association. At step 518, the plurality of ContextType associations are extracted between each of the plurality of extended feature elements and the corresponding plurality of ContextType elements based on the corresponding ContextType. Finally, at step 520, the contextual product feature model is generated by updating the extracted plurality of ContextType associations between each of the plurality of extended feature elements and the corresponding plurality of ContextType elements.

In an embodiment, updating the extracted plurality of ContextType associations between each of the plurality of extended feature elements and the corresponding plurality of ContextType elements is explained below. The updation is performed by creating the contextType association between the corresponding features and the corresponding ContextType element. For example, the contextType associations includes a "core" ContextType association, "geo" ContextType association and a "client" ContextType association. In an embodiment, now referring to FIG. 6A, the ContextType element 604 is associated with the feature element 410 using a contextType association. In another embodiment, now referring to FIG. 6B, the feature 410B is associated with the core element 630 using a "core" ContextType association. The contextual feature description 640A of the feature 410A is associated with the element 638 using the "geo" ContextType association. Similarly, the contextual feature description 640B of the feature 410A is associated with the element 632 using the "client" ContextType association.

Figure 6A:
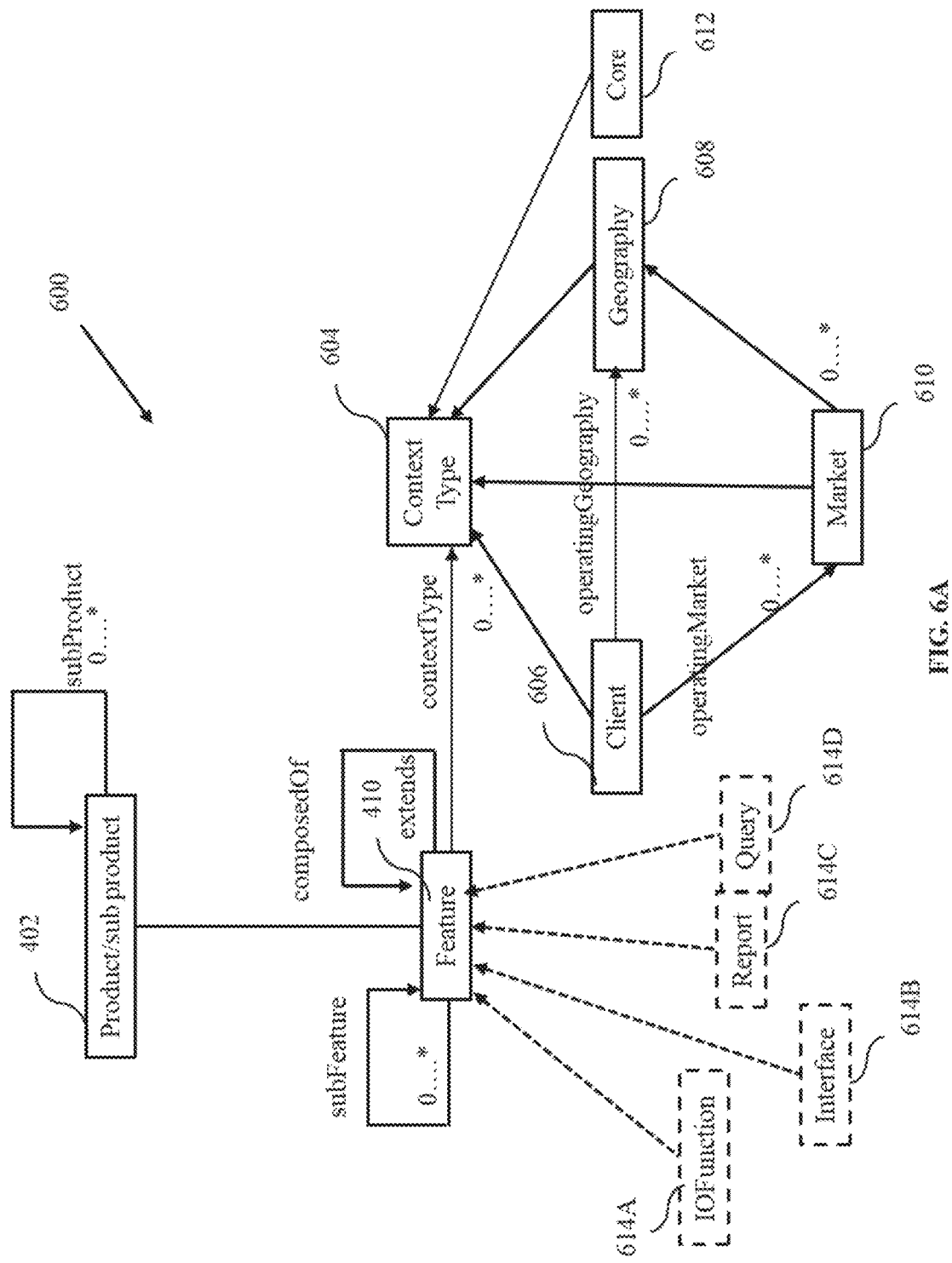
FIG. 6A illustrates a conceptual contextual feature model for the processor implemented method for extracting contextual product feature model from requirements specification documents implemented by the system of FIG. 1, in accordance with some embodiments of the present disclosure.

FIG. 6A illustrates a conceptual contextual feature model for the processor implemented method for extracting contextual product feature model from requirement specification documents implemented by the system of FIG. 1, in accordance with some embodiments of the present disclosure. Now referring to FIG. 6A, product may have subproducts, hence the product/sub product 402 is having a "subProduct" association with itself. A product/subproduct includes a composedOf association and a subFeature association to itself. The subFeature association is a part of feature hierarchy explained in conjunction with FIG. 4. The plurality of features are extended for a plurality of specific ContextTypes. In an embodiment, the feature 410 is having a "contextType" association with the element 604 named "ContextType". The ContextTypes "client" 606, "Market"610, "geography" 608 are associated with the ContextType 604. The "client" 606 operates in a "Market" 610 and is associated with "operatingMarket" association. The "client" 606 operates in a "Geography" and is associated with "operatingGeography" association. The "Market" 610 belongs to a "Geography" 608. The "core" ContextType is given in 612. Further, the feature 410 includes a plurality of specialized features corresponding to the plurality of feature types including the IO Function 614A, the interface 614B, the report 614C and the query 614D. The plurality of specialized features represented using dotted lines.

Figure 6B:
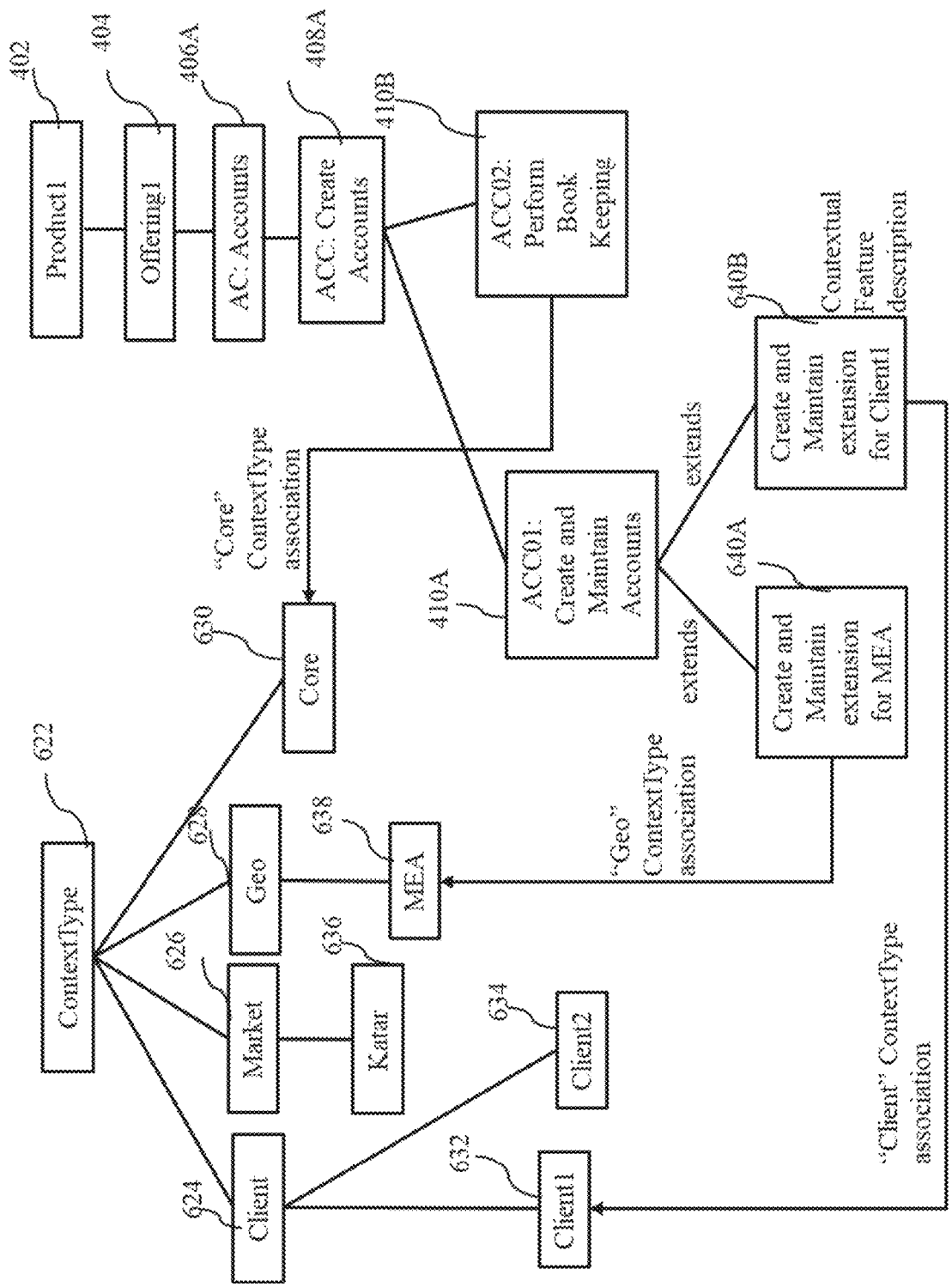
FIG. 6B illustrates an example contextual feature model for the processor implemented method for extracting contextual product feature model from requirements specification documents implemented by the system of FIG. 1, in accordance with some embodiments of the present disclosure.

FIG. 6B illustrates an example contextual feature model for the processor implemented method for extracting contextual product feature model from requirement specification documents implemented by the system of FIG. 1, in accordance with some embodiments of the present disclosure.

In an embodiment, the contextual feature associated with the feature "ACC: Create Accounts" 408A is explained in conjunction with FIG. 6B. Now referring to FIG. 6B, the ContextType element 622 includes a plurality of ContextTypes "Client" 624, "Market" 626, "Geo" 628 and "Core" 630. The "Client" ContextType 624 includes two client relations "Client1" 632 and "Client2" 634. The market ContextType "Market" 626 includes a market "Katar" 636. Further, the geography ContextType" 628 includes the geography "MEA" 638, wherein "MEA" indicated Middle East Asia". The feature "ACC01: Create and Maintain Accounts" 410A, is associated with two ContextType associations including the client ContextTypes "Client1" 632 and the "Client2" 634. Further, the feature "ACC01: Create and Maintain Accounts" 410A includes a contextual feature description "Create and Maintain extension for Client1" 640B associated with the "Client1" 632 and another contextual feature description "Create and Maintain extension for MEA" 640A associated with "MEA" 638. The feature "ACC02: Perform Book Keeping" 410B is a core ContextType and is associated with "Core" 630.

Figure 7:
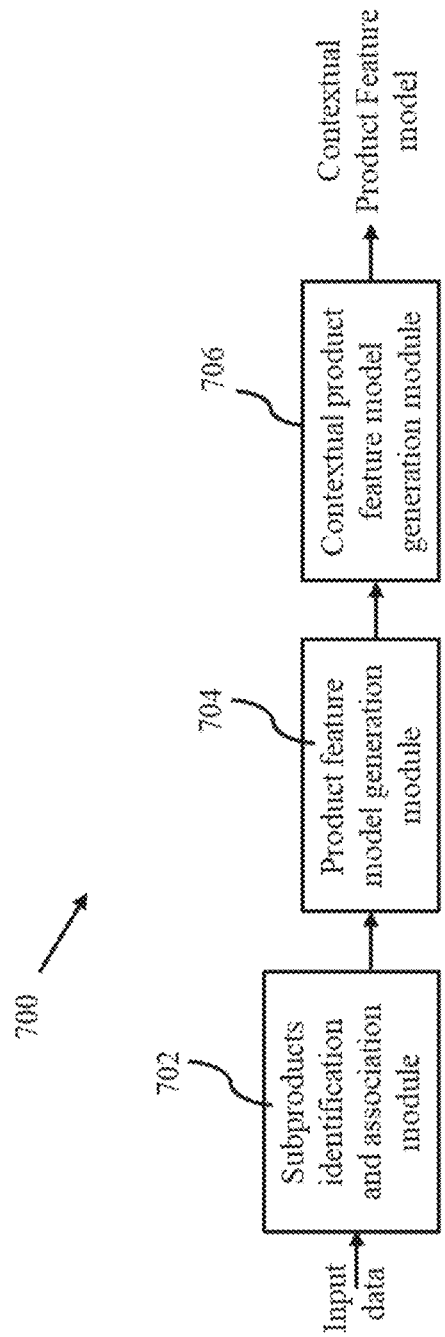
FIG. 7 illustrates an overall functional architecture for the processor implemented method for extracting contextual product feature model from requirements specification documents implemented by the system of FIG. 1, in accordance with some embodiments of the present disclosure.

FIG. 7 illustrates an overall functional architecture 700 for the processor implemented method for extracting contextual product feature model from requirement specification documents implemented by the system of FIG. 1, in accordance with some embodiments of the present disclosure. Now referring to FIG. 7, the functional architecture 700 includes a sub product identification and association module 702, a product feature model generation module 704, a ContextType generation module 706, and a contextual product feature model generation module 706. Now referring to FIG. 7, the sub product identification and association module 702 receives the plurality of requirement specification documents pertaining to the product, the domain dictionary, the plurality of configuration parameters, and the plurality of extraction patterns. The sub product identification and association module 702 performs the identification of the plurality of sub products based on the comparison between each of the plurality of requirement specification documents and the plurality of sub product patterns. The sub product identification and association module 702 simultaneously generates the sub product association between the product and each of the plurality of sub products. The product feature model generation module 704 generates the product feature model for each of the plurality of sub products using the feature extraction technique. The product feature model includes the plurality of product feature elements arranged hierarchically based on the predefined hierarchy level. The plurality of product feature elements includes the feature area, the major feature and the plurality of features. The contextual product feature model generation module 708 generates the contextual product feature model based on the product feature model using the ContextType extraction technique. The ContextType includes the core, the client, the geography and the market.

In an embodiment, the context based product feature model constructed from the requirement specification documents using the method 200 is used for generating a context based feature export based on the requirement of the user. For example, the context based feature export includes a feature export with context tagging, a product core vs extended report, a feature type categorization report and a client specific feature report.

Figure 8:
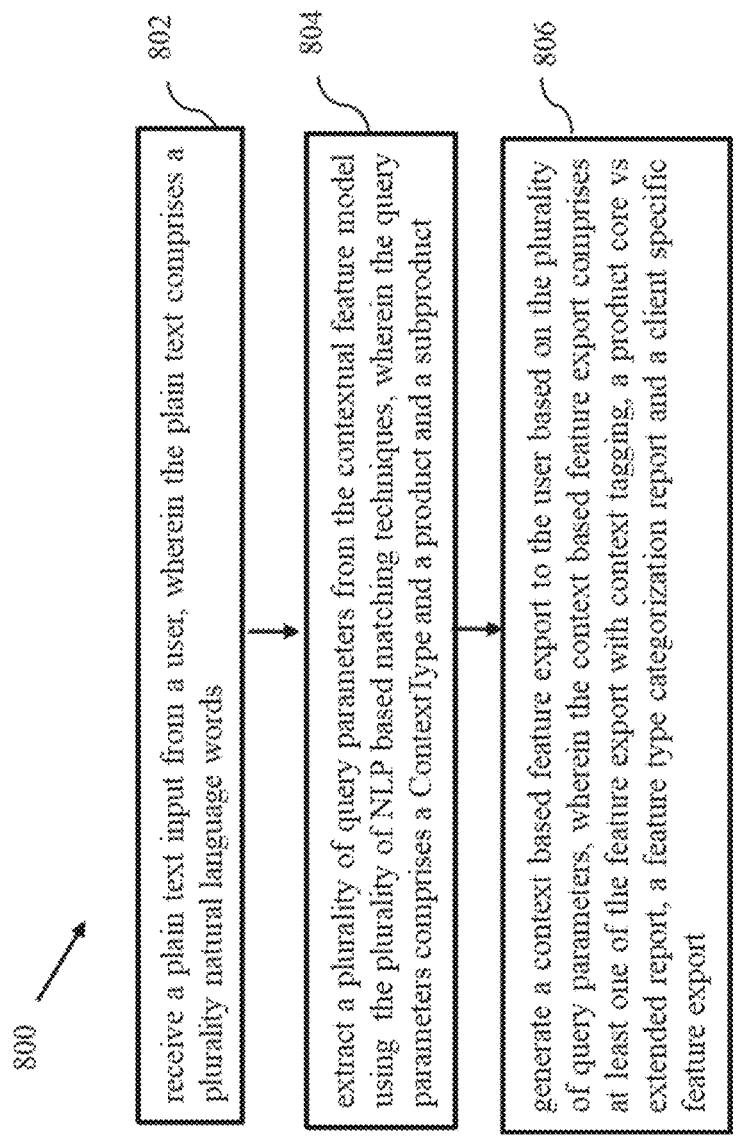
FIG. 8 illustrates a flow diagram for generating a context-based feature export for the processor implemented method for extracting contextual product feature model from requirements specification documents implemented by the system of FIG. 1, in accordance with some embodiments of the present disclosure.

FIG. 8 illustrates a flow diagram 800 for generating a context based feature export, for the processor implemented method for extracting contextual product feature model from requirement specification documents implemented by the system of FIG. 1, in accordance with some embodiments of the present disclosure. Now, referring to FIG. 8. at step 802, the method 800 receives a plain text input from a user. The plain text includes a plurality natural language word. At step 804, a plurality of query parameters are extracted from the contextual feature model using the plurality of NLP based matching techniques. The query parameters include the ContextType and the product and the sub product. At step 806, a context based feature export is generated to the user based on the plurality of query parameters. The context based feature export includes at least one of the feature exports with context tagging, a product core vs extended report, a feature type categorization report and a client specific feature report.

In an embodiment, the experimental results for the system 100 are discussed as follows. An example features hierarchy digitization output for the system 100 for a plurality of requirement specification documents is shown in table I.

Now referring to table I, the table I clearly shows the number of products, feature areas, major feature and features extracted from the requirement specification document. Further, the table I illustrates the number of core features, number of extended features and a context-wise feature breakup.

TABLE 1

|  | Product 1 | Product 2 |
| --- | --- | --- |
| Feature-hierarchy decomposition | | |
| Source requirement specification documents | 26 | 42 |
| Feature Areas | 21 | 7 |
| Major Features | 84 | 41 |
| Features | 848 | 168 |
| Product Core Vs Extended | | |
| Core Features | 680 | 717 |
| Extended Features | 168 | 238 |
| ContextType-wise Feature breakup | | |
| Client Specific Features | 159 | 238 |
| Market Specific Features | 5 | 0 |
| Geography Specific Features | 4 | 0 |

In an embodiment, an example features type classification data obtained from the system 100 is shown in table II. Now referring to table II, the feature count for each of the plurality of features types and the corresponding percentage in the total number of features is illustrated.

TABLE II

| Feature Type | Feature Count | Feature type % |
| --- | --- | --- |
| IO Function | 321 | 38% |
| Interface | 112 | 13% |
| Report | 252 | 30% |
| Query | 66 | 8% |
|  | 848 |  |

In an embodiment, the context based feature export generated by the method 800 is shown in table III. Now referring to table III, the context based feature report includes a product/offering, feature area, major feature, feature ID, feature name, feature description, and the feature type and ContextType.

TABLE III

| Feature area | Major feature | Feature name | Feature description | Feature type | Context Type |
| --- | --- | --- | --- | --- | --- |
| Client Relations | Client Partners | Create Client Partner Details | The Client Relations functionality captures and maintains the details of all the entities . . . | IO Function | Core |
| Client Relations | Client Partners | Create Client Partner Details-Client1 | Processing of the Civil ID file: The Ministry can send the details of the Client Partners to Client1 using a csv file at specific intervals, say once a year . . . | IO Function | Client1 |

TABLE III-continued

| Feature area | Major feature | Feature name | Feature description | Feature type | Context Type |
|---|---|---|---|---|---|
| Client Relations | Client Partners | Create Client Partner Details-Client2 | Company will be captured as an interactive CP, whereas Family and Ledger will be captured as Non-Interactive CP in the system. CP ID can be between 3 to 35 alphanumeric characters in . . . | IO Function | Client2 |
| Client Relations | Client Partners | Create and Maintain CP Relationship | The system has the capability to capture the relationship between 2 client partners. The relationship between the client partners is captured by the user through GUI. | IO Function | Core |
| Client Relations | Client Relations Interfaces | Client Partner Creation File | File contains the details of the new CPs to be created in the system. This is an Input file received from External systems . . . | Interface | Core |
| Client Relations | Client Relations Reports | Master List of Client Partners | This report displays the list of all client Partners maintained in the system. | Report | Core |
| Client Relations | Client Relations Reports | List of Suspended Client Partners | This report displays the list of Suspended Client Partners in the system. | Report | Core |

In an embodiment, the formula for computing digitization value for each of the plurality of products or sub products are given in equation (1). For example, the mean feature digitization value for the product 1 and the product 2 given in table I are 32.6 and 22.7 respectively.

$$\text{Mean feature digitization} = \frac{\sum(\text{feature count})}{\sum(\text{file count})} \quad (1)$$

Figure 9A:
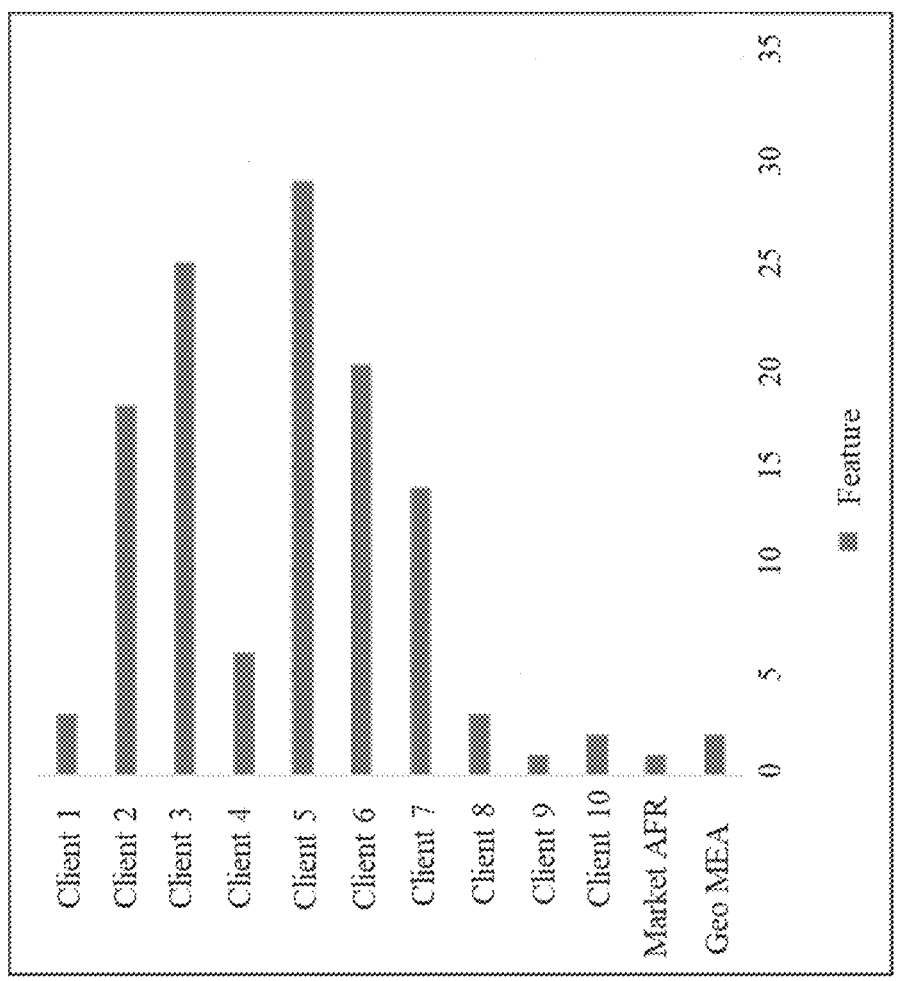
FIGS. 9A and 9B illustrates experimentation results for the processor implemented method for extracting contextual product feature model from requirements specification documents implemented by the system of FIG. 1, in accordance with some embodiments of the present disclosure.

In an embodiment, the number of features corresponding to each ContextType is shown in table IV and the corresponding bar chart is shown in FIG. 9A.

TABLE IV

| ContextType | Number of corresponding features |
|---|---|
| Geo MEA | 2 |
| Market AFR | 1 |
| Client 10 | 2 |
| Client 9 | 1 |
| Client 8 | 3 |
| Client 7 | 14 |
| Client 6 | 20 |
| Client 5 | 29 |
| Client 4 | 6 |
| Client 3 | 25 |
| Client 4 | 18 |
| Client 1 | 3 |
| Product Core | 336 |

Figure 9B:
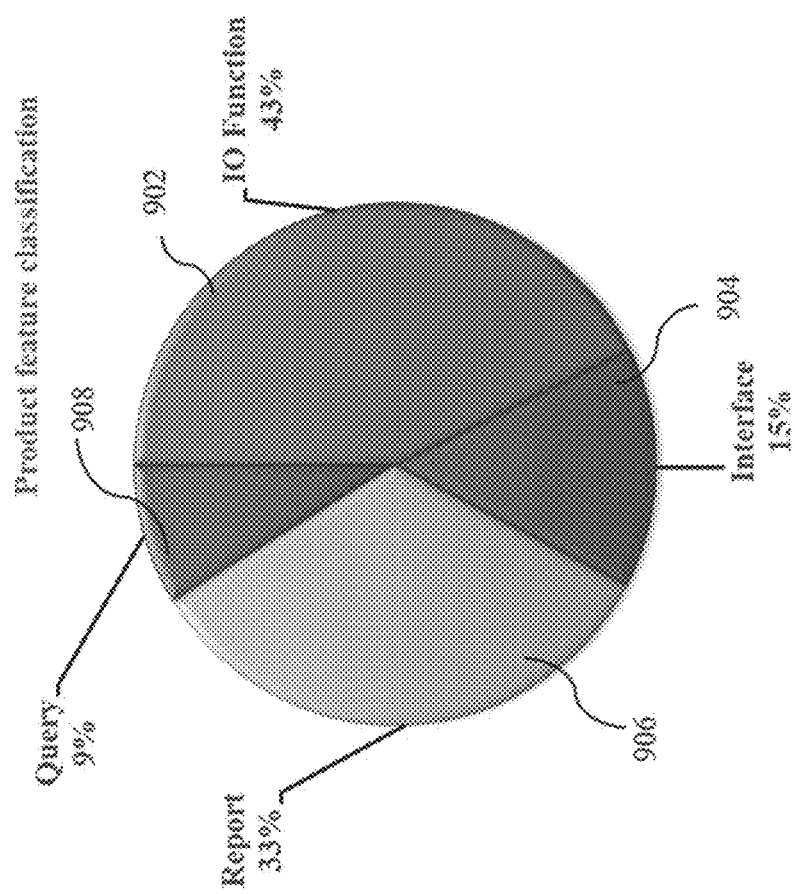

In an embodiment, the classification of features based on the corresponding feature type is shown in FIG. 9B. Now referring to FIG. 9B, each slice of the pie chart indicates the corresponding percentage of feature categories. For example, there are 38% of IO function features 902, 13% of interfaces 904, 30% of reports 906 and 8% of queries 908.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of extracting the contextual product feature model from requirement specification documents. The present disclosure provides an easy text-to-model and model-to-text transformation. It encapsulates the key feature concepts discussed such as feature hierarchy, feature type classification and business context and the like. Further, the present disclosure extracts and populates the contextual feature model using NLP. Furthermore, the present disclosure is capable of generating reports including the product or for a specific client, for a specific feature and for any level of granularity.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:
1. A processor implemented method, the method comprising:
receiving, by one or more hardware processors, a data pertaining to a product, wherein the data comprises a plurality of requirement specification documents, a domain dictionary, a plurality of configuration parameters, and a plurality of extraction patterns;
identifying, by the one or more hardware processors, a plurality of sub products associated with the product based on a comparison between each of the plurality of requirement specification documents and a plurality of sub product patterns;
generating, by the one or more hardware processors, a product feature model for each of the plurality of sub products using a feature extraction technique, wherein the product feature model comprises a plurality of product feature elements arranged hierarchically based on a predefined hierarchy level, wherein the plurality of product feature elements comprises a feature area, a major feature, and a plurality of features, wherein each of the plurality of features is associated with a feature type, wherein the feature type comprises an IO (Input Output) function, an interface, a query and a report, wherein each of a plurality of products comprises a plurality of product properties, wherein the plurality of product properties comprises a product ID, a product name, and a product description, wherein each of the plurality of sub products comprises a plurality of sub product properties, wherein the plurality of sub product properties comprises a sub product ID, a sub product name, and a sub product description, wherein each of the plurality of product feature elements comprises a plurality of product feature properties, and wherein the plurality of product feature properties comprises a corresponding ID, a corresponding name, and a corresponding description,
wherein each of the major feature comprises one or more logical functional units called the plurality of features, wherein the logical functional unit is capable of performing a function,
wherein the IO function feature type is an IO functional unit part of an application and facilities users to carry out tasks,
wherein Create Read Update Delete (CRUD) operations are supported through the IO functions, wherein IO function patterns comprise a text including a use case, and a screen,
wherein the interface feature type comprises properties with a source system, a target system, a direction, a mode, a frequency, and a file format, wherein features having names embedding words as an interface or a message are classified into the interface feature type, wherein the interface feature type is a shared boundary between two functional units including the major feature or the plurality of features, defined by characteristics pertaining to the functions,
wherein the report feature type comprises properties with a report layout, a language, a distribution list, and a timing, wherein the features having names embedding word as the report are classified into the report feature type, and
wherein the features having names embedding words as a view, the query, enquire are classified into the query feature type; and
generating, by the one or more hardware processors, a contextual product feature model based on the product feature model using a ContextType extraction tech- nique, wherein the ContextType comprises a core, a client, a geography, and a market.

2. The processor implemented method of claim 1, wherein the plurality of extraction patterns comprises a plurality of sub product patterns, a plurality of feature type patterns, a plurality of feature area patterns, a plurality of major feature patterns and a plurality of feature patterns and a plurality of ContextType patterns, wherein the plurality of configuration parameters comprises the predefined hierarchy level and the predefined list of clients, a predefined list of geographies and a predefined list of markets.

3. The processor implemented method of claim 1, wherein the method of generating a product feature model for each of the plurality of sub products using a feature extraction technique comprises:
receiving the plurality of requirement specification documents and the plurality of sub products, the domain dictionary and the plurality of configuration parameters;
preprocessing the plurality of requirement specification documents, wherein preprocessing comprises removal of a plurality of formatting errors from each of the plurality of requirement specification documents;
initializing a product feature model corresponding to each of the plurality of sub products by generating a sub product element for each of the plurality of sub products;
extracting the plurality of feature area, the plurality of major features and the plurality of features corresponding to the sub product from each of the preprocessed requirement specification documents using a document structure based matching technique;
updating the corresponding product feature model corresponding to each of the plurality of sub products by:
generating a plurality of product feature elements corresponding to the extracted the plurality of feature area, the plurality of major features and the plurality of features based on the predefined hierarchy level;
generating a corresponding association between the corresponding sub product element and each of the generated plurality of product feature elements; and
generating a corresponding association between each of the plurality of product feature elements;
identifying a feature type associated with each of the plurality of features based on a comparison between each of the plurality of features and a plurality of feature type patterns;
identifying a plurality of features without associations from the updated product feature model by traversing the updated product feature model; and
identifying a plurality of upper hierarchy associations corresponding to plurality of features without associations using an NLP based matching technique, wherein the NLP based matching technique comprises a feature ID based exact matching, a feature name based exact matching, a feature name based inexact matching, a feature type based exact matching and a feature description based inexact matching.

4. The processor implemented method of claim 3, the document structure based matching technique extracts the plurality of feature area, the plurality of major features and the plurality of features based on a comparison between a plurality of document structures corresponding to the plurality of preprocessed requirement specification documents and the plurality of corresponding extraction patterns, wherein the plurality of document structures comprises a heading structure and a table structure.

5. The processor implemented method of claim 3, wherein the feature ID based exact matching compares the corresponding IDs of each of the plurality of features without associations with the IDs corresponding to each of the plurality of product feature elements in the product feature model, wherein the feature name based exact matching compares the names of each of the plurality of features without associations with the names corresponding to each of the plurality of product feature elements in the product feature model, wherein the feature name based inexact matching compares the names of the each of the plurality of features without associations with the names corresponding to each of the plurality of product feature elements in the product feature model, wherein the feature type based exact matching compares the feature types of each of the plurality of features without associations with the feature types corresponding to each of the plurality of product feature elements in the product feature model and, wherein the feature description based inexact matching compares the feature description of each of the plurality of features without associations with the feature description corresponding to each of the plurality of product feature elements in the product feature model.

6. The processor implemented method of claim 1, wherein the method of generating a contextual product feature model based on the product feature model using a ContextType extraction technique comprises:
receiving the product feature model, the plurality of ContextType extraction parameters, and the domain dictionary;
extracting a plurality of ContextTypes for each of the plurality of features in the product feature model based on a comparison between the plurality of ContextType extraction patterns and the corresponding description associated with each of the plurality of features;
generating a plurality of ContextType elements based on the extracted plurality of ContextTypes, wherein a ContextType element is created corresponding to each of the plurality of ContextTypes;
identifying a plurality of extension scenario for each of the plurality of features based on the plurality of ContextTypes, wherein the extension scenario is set to one if there is at least one ContextType and the extension scenario set to zero if there is no ContextType;
updating the ContextType for the plurality of feature with extension scenario equal to zero as "core";
identifying a number of extensions corresponding to each of the plurality of features with the extension scenario not equal to zero;
generating a plurality of extended feature elements based on the number of extensions corresponding to each of the plurality of features, wherein each of the plurality of extended feature elements are associated with a corresponding context specific feature description extracted from the plurality of preprocessed requirement specification documents based on the corresponding ContextType;
generating an "extends" association between the corresponding feature element and the corresponding plurality of extended feature elements;
extracting the plurality of ContextType associations between each of the plurality of extended feature elements and the corresponding plurality of ContextType elements based on the corresponding ContextType; and
generating the contextual product feature model by updating the extracted plurality of ContextType associations between each of the plurality of extended feature elements and the corresponding plurality of ContextType elements.

7. The processor implemented method of claim 1, further comprises generating a context based feature export to the user, by:
receiving a plain text input from a user, wherein the plain text input comprises a plurality natural language words;
extracting a plurality of query parameters from the contextual feature model using the plurality of NLP based matching techniques, wherein the query parameters comprises a ContextType and a product and a sub product; and
generating a context based feature export to the user based on the plurality of query parameters, wherein the context based feature export comprises at least one of the feature export with context tagging, a product core vs extended report, a feature type categorization report and a client specific feature report.

8. A system comprising:
at least one memory storing programmed instructions; one or more Input/Output (I/O) interfaces; and one or more hardware processors operatively coupled to the at least one memory, wherein the one or more hardware processors are configured by the programmed instructions to:
receive a data pertaining to a product, wherein the data comprises a plurality of requirement specification documents, a domain dictionary, a plurality of configuration parameters, and a plurality of extraction patterns;
identify a plurality of sub products associated with the product based on a comparison between each of the plurality of requirement specification documents and a plurality of sub product patterns;
generate a product feature model for each of the plurality of sub products using a feature extraction technique, wherein the product feature model comprises a plurality of product feature elements arranged hierarchically based on a predefined hierarchy level, wherein the plurality of product feature elements comprises a feature area, a major feature, and a plurality of features, wherein each of the plurality of features is associated with a feature type, wherein the feature type comprises an IO (Input Output) function, an interface, a query and a report, wherein each of a plurality of products comprises a plurality of product properties, wherein the plurality of product properties comprises a product ID, a product name, and a product description, wherein each of the plurality of sub products comprises a plurality of sub product properties, wherein the plurality of sub product properties comprises a sub product ID, a sub product name, and a sub product description, wherein each of the plurality of product feature elements comprises a plurality of product feature properties, and wherein the plurality of product feature properties comprises a corresponding ID, a corresponding name, and a corresponding description,
wherein each of the major feature comprises one or more logical functional units called the plurality of features, wherein the logical functional unit is capable of performing a function,
wherein the IO function feature type is an IO functional unit part of an application and facilities users to carry out tasks,
wherein Create Read Update Delete (CRUD) operations are supported through the IO functions, wherein IO function patterns comprise a text including a use case, and a screen,
wherein the interface feature type comprises properties with a source system, a target system, a direction, a mode, a frequency, and a file format, wherein features having names embedding words as an interface or a message are classified into the interface feature type, wherein the interface feature type is a shared boundary between two functional units including the major feature or the plurality of features, defined by characteristics pertaining to the functions,
wherein the report feature type comprises properties with a report layout, a language, a distribution list, and a timing, wherein the features having names embedding word as the report, are classified into the report feature type, and
wherein the features having names embedding words as a view, the query, enquire are classified into the query feature type; and
generate a contextual product feature model based on the product feature model using a ContextType extraction technique, wherein the ContextType comprises a core, a client, a geography, and a market.

9. The system of claim 8, wherein the plurality of extraction patterns comprises a plurality of sub product patterns, a plurality of feature type patterns, a plurality of feature area patterns, a plurality of major feature patterns and a plurality of feature patterns and a plurality of ContextType patterns, wherein the plurality of configuration parameters comprises the predefined hierarchy level and the predefined list of clients, a predefined list of geographies and a predefined list of markets.

10. The system of claim 8, wherein the method of generating a product feature model for each of the plurality of sub products using a feature extraction technique comprises:
receiving the plurality of requirement specification documents and the plurality of sub products, the domain dictionary and the plurality of configuration parameters;
preprocessing the plurality of requirement specification documents, wherein preprocessing comprises removal of a plurality of formatting errors from each of the plurality of requirement specification documents;
initializing a product feature model corresponding to each of the plurality of sub products by generating a sub product element for each of the plurality of sub products;
extracting the plurality of feature area, the plurality of major features and the plurality of features corresponding to the sub product from each of the preprocessed requirement specification documents using a document structure based matching technique;
updating the corresponding product feature model corresponding to each of the plurality of sub products by:
generating a plurality of product feature elements corresponding to the extracted the plurality of feature area, the plurality of major features and the plurality of features based on the predefined hierarchy level;
generating a corresponding association between the corresponding sub product element and each of the generated plurality of product feature elements; and
generating a corresponding association between each of the plurality of product feature elements;

identifying a feature type associated with each of the plurality of features based on a comparison between each of the plurality of features and a plurality of feature type patterns;

identifying a plurality of features without associations from the updated product feature model by traversing the updated product feature model; and identifying a plurality of upper hierarchy associations corresponding to plurality of features without associations using an NLP based matching technique, wherein the NLP based matching technique comprises a feature ID based exact matching, a feature name based exact matching, a feature name based inexact matching, a feature type based exact matching and a feature description based inexact matching.

11. The system of claim 10, the document structure based matching technique extracts the plurality of feature area, the plurality of major features and the plurality of features based on a comparison between a plurality of document structures corresponding to the plurality of preprocessed requirement specification documents and the plurality of corresponding extraction patterns, wherein the plurality of document structures comprises a heading structure and a table structure.

12. The system of claim 10, wherein the feature ID based exact matching compares the corresponding IDs of each of the plurality of features without associations with the IDs corresponding to each of the plurality of product feature elements in the product feature model, wherein the feature name based exact matching compares the names of each of the plurality of features without associations with the names corresponding to each of the plurality of product feature elements in the product feature model, wherein the feature name based inexact matching compares the names of the each of the plurality of features without associations with the names corresponding to each of the plurality of product feature elements in the product feature model, wherein the feature type based exact matching compares the feature type of each of the plurality of features without associations with the feature type corresponding to each of the plurality of product feature elements in the product feature model and, wherein the feature description based inexact matching compares the feature description of each of the plurality of features without associations with the feature description corresponding to each of the plurality of product feature elements in the product feature model.

13. The system of claim 8, wherein the one or more hardware processors are configured to generate a contextual product feature model based on the product feature model using a ContextType extraction technique comprises:

receiving the product feature model, the plurality of ContextType extraction parameters, and the domain dictionary;

extracting a plurality of ContextTypes for each of the plurality of features in the product feature model based on a comparison between the plurality of ContextType extraction patterns and the corresponding description associated with each of the plurality of features;

generating a plurality of ContextType elements based on the extracted plurality of ContextTypes, wherein a ContextType element is created corresponding to each of the plurality of ContextTypes;

identifying a plurality of extension scenario for each of the plurality of features based on the plurality of ContextTypes, wherein the extension scenario is set to one if there is at least one ContextType and the extension scenario set to zero if there is no ContextType;

updating the ContextType for the plurality of feature with extension scenario equal to zero as "core";

identifying a number of extensions corresponding to each of the plurality of features with the extension scenario not equal to zero;

generating a plurality of extended feature elements based on the number of extensions corresponding to each of the plurality of features, wherein each of the plurality of extended feature elements are associated with a corresponding context specific feature description extracted from the plurality of preprocessed requirement specification documents based on the corresponding ContextType;

generating an "extends" association between the corresponding feature element and the corresponding plurality of extended feature elements;

extracting the plurality of ContextType associations between each of the plurality of extended feature elements and the corresponding plurality of ContextType elements based on the corresponding ContextType; and generating the contextual product feature model by updating the extracted plurality of ContextType associations between each of the plurality of extended feature elements and the corresponding plurality of ContextType elements.

14. The system of claim 8, further comprises generating a context based feature export to the user, by:

receiving a plain text input from a user, wherein the plain text input comprises a plurality natural language words;

extracting a plurality of query parameters from the contextual feature model using the plurality of NLP based matching techniques, wherein the query parameters comprises a ContextType and a product and a sub product; and generating a context based feature export to the user based on the plurality of query parameters, wherein the context based feature export comprises at least one of the feature export with context tagging, a product core vs extended report, a feature type categorization report and a client specific feature report.

15. One or more non-transitory machine-readable information storage mediums comprising one or more instructions which when executed by one or more hardware processors cause:

receiving a data pertaining to a product, wherein the data comprises a plurality of requirement specification documents, a domain dictionary, a plurality of configuration parameters, and a plurality of extraction patterns;

identifying a plurality of sub products associated with the product based on a comparison between each of the plurality of requirement specification documents and a plurality of sub product patterns;

generating a product feature model for each of the plurality of sub products using a feature extraction technique, wherein the product feature model comprises a plurality of product feature elements arranged hierarchically based on a predefined hierarchy level, wherein the plurality of product feature elements comprises a feature area, a major feature, and a plurality of features, wherein each of the plurality of features is associated with a feature type, wherein the feature type comprises an IO (Input Output) function, an interface, a query and a report, wherein each of a plurality of products comprises a plurality of product properties, wherein the plurality of product properties comprises a product ID, a product name, and a product description, wherein each of the plurality of sub products comprises a plurality of sub product properties, wherein the plurality of sub product properties comprises a sub product ID, a sub product name, and a sub product description, wherein each of the plurality of product feature elements comprises a plurality of product feature properties, and wherein the plurality of product feature properties comprises a corresponding ID, a corresponding name, and a corresponding description, wherein each of the major feature comprises one or more logical functional units called the plurality of features, wherein the logical functional unit is capable of performing a function, wherein the IO function feature type is an IO functional unit part of an application and facilities users to carry out tasks, wherein Create Read Update Delete (CRUD) operations are supported through the IO functions, wherein IO function patterns comprises a text including a use case, and a screen, wherein the interface feature type comprises properties with a source system, a target system, a direction, a mode, a frequency, and a file format, wherein features having names embedding words as an interface or a message are classified into the interface feature type, wherein the interface feature type is a shared boundary between two functional units including the major feature or the plurality of features, defined by characteristics pertaining to the functions, wherein the report feature type comprises properties with a report layout, a language, a distribution list, and a timing, wherein the features having names embedding word as the report, are classified into the report feature type, and wherein the features having names embedding words as a view, the query, enquire are classified into the query feature type; and generating a contextual product feature model based on the product feature model using a ContextType extraction technique, wherein the ContextType comprises a core, a client, a geography, and a market.

16. The one or more non-transitory machine-readable information storage mediums of claim 15, wherein the plurality of extraction patterns comprises a plurality of sub product patterns, a plurality of feature type patterns, a plurality of feature area patterns, a plurality of major feature patterns and a plurality of feature patterns and a plurality of ContextType patterns, wherein the plurality of configuration parameters comprises the predefined hierarchy level and the predefined list of clients, a predefined list of geographies and a predefined list of markets.

* * * * *